US006682766B2

(12) United States Patent
Blumenstein-Stahl et al.

(10) Patent No.: US 6,682,766 B2
(45) Date of Patent: *Jan. 27, 2004

(54) BEVERAGE COMPRISING AN EFFECTIVE AMOUNT OF FLAVANOLS AS SWEETNESS CUTTING COMPOSITION

(75) Inventors: Gabriele Annemarie Blumenstein-Stahl, Hofheim (DE); Christa Maria Fischer, Kronberg (DE); Ingeborg Olbert, Coburg (DE)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/555,586

(22) PCT Filed: Dec. 1, 1998

(86) PCT No.: PCT/US98/25443

§ 371 (c)(1),
(2), (4) Date: Aug. 17, 2000

(87) PCT Pub. No.: WO99/27803

PCT Pub. Date: Jun. 10, 1999

(65) Prior Publication Data

US 2003/0157229 A1 Aug. 21, 2003

(30) Foreign Application Priority Data

Dec. 1, 1997 (EP) ............................... 97121087

(51) Int. Cl.$^7$ ................................. A23L 2/00
(52) U.S. Cl. .................. 426/590; 426/477; 426/548; 426/591; 426/592; 426/599
(58) Field of Search ................. 426/548, 590, 426/591, 592, 593, 594, 595, 596, 597, 598, 599, 474, 477

(56) References Cited

U.S. PATENT DOCUMENTS

| 4,906,480 A | 3/1990 | Kashket .................... 426/3 |
| 4,946,701 A | 8/1990 | Tsai et al. ................ 426/597 |
| 5,464,619 A | 11/1995 | Kuznicki et al. ......... 424/195.1 |
| 5,681,569 A | 10/1997 | Kuznicki et al. ......... 424/195.1 |
| 5,902,628 A | * 5/1999 | Shamil .................... 426/590 |

FOREIGN PATENT DOCUMENTS

| EP | 416718 | 3/1991 | |
| JP | 8 256 725 | 10/1996 | ............. A23L/1/236 |
| WO | 96/04801 | 2/1996 | ............. A23F/3/16 |
| WO | 9633728 | 10/1996 | |
| WO | 97/30597 | 8/1997 | ............. A23F/3/20 |

OTHER PUBLICATIONS

Hawley, G.G. ed., The Condensed Chemical Dictionary, Tenth Edition, 1981, Van Nostrand Reinhold Company, New York, pp. 992–993.*

* cited by examiner

*Primary Examiner*—Leslie Wong
(74) *Attorney, Agent, or Firm*—S Robert Chuey

(57) ABSTRACT

The present invention relates to substantially alcohol free beverages having a sweetener system which ensures the full perception of the flavour system within the beverage while at the same time containing flavanols as a sweetness cutting material which reduces the sweetness impression of the sweetener system. In particular the present invention relates to beverages which are considered most appealing to an adult taste, having a full flavour impression while being considered less sweet than conventional beverages usually designed for children,

8 Claims, No Drawings

US 6,682,766 B2

BEVERAGE COMPRISING AN EFFECTIVE AMOUNT OF FLAVANOLS AS SWEETNESS CUTTING COMPOSITION

This is a National Stage filing of PCT/US98/25443 filed Dec. 1, 1998.

FIELD OF THE INVENTION

The present invention relates to substantially alcohol free beverages having a sweetener system which ensures the full perception of the flavour system within the beverage while at the same time comprising flavanols as a sweetness cutting material which reduces the sweetness impression of the sweetener system. In particular the present invention relates to beverages which are considered most appealing to an adult taste, having a full flavour impression while being considered less sweet than conventional beverages usually designed for children, who prefer a stronger sweetness impression.

BACKGROUND OF THE INVENTION

It is well-known in the art that in order to provide a beverage with a well rounded and full bodied flavour it is necessary to provide a sweetening system containing natural and/or artificial sweetening components such as sugar and high intensity sweetening compounds such as saccharin, acesulfam K, cyclamate, or aspartame (known under the trade name Nutra-Sweet). On the other hand it is known that in particular adult consumers of beverages have a desire for a less sweet beverage composition.

In order to provide in particular adult consumers with a less sweet tasting beverage several well-known alternatives are available. The addition of a bitter tasting ingredient such as chinin or grapefruit flavours have been tried in tonics and citrus beverages (also alcohol free beer could be considered in this context). However, many consumers do not find a bitter note appealing, in particular since it usually is not adequate to overcome the sweetness perception in such beverages as tonic water, bitter lemon or grapefruit juice comprising beverages. Even so these beverages comprise a bitter tasting compound they are still rated as too sweet mostly by adult consumers.

An alternative conventionally used is to increase the amount of acids in a beverage in order to change the sweetness impression of the sweetening composition comprised in the beverage. However, this has limitations in that too much added acids in beverages are not appealing to many consumers and some actually complain about heartburn caused by a too high acidity.

A third apparent alternative is the reduction of the sweetening composition amount in order to reduce the sweetness impression of a beverage. However, this (as indicated above) causes a reduction of the flavour impression of such a beverage composition and therefore causes a lack of appealing flavour to consumers of such beverages. At the same time a reduction of the sweetening compounds covers a consistency/mouth feel change which often is described as "watery" further enhancing the impression that such a beverage has less flavour.

One possibility widely used in beverage compositions, however for different reasons (such as a preservation effect or as an acidifier), is to provide the beverage with a sparkling $CO_2$ content. This does have a reducing effect on the sweetness impression of such compositions. At the same time the addition of $CO_2$ to beverage compositions reduces all taste impressions in line with the reduction of the sweetness impression. The reason for this is believed to be caused by the reduced amount of liquid actually contacting taste corpuscles on the sensoric sensitive areas of the mouth when drinking such compositions. Based on this $CO_2$ is added usually to beverages for it's refreshing effect and as part of the preservative system in beverages.

Therefore, the inventors of the present invention have investigated whether the addition of certain compounds would not provide a solution to the problems associated with conventional attempts to reduce the sweetness impression of alcohol free beverages. It now has been found that indeed the addition of certain well-known compounds causes a reduction in the sweetness impression of a beverage composition. The addition of such sweetness cutting compounds is, however, also associated with a detrimental flavour effect on the beverage compositions and hence has conventionally not been used in order to provide a sweetness cutting effect but for other reasons.

It is therefore an objective of the present invention to provide beverage compositions without reducing the sweetening composition contained in such beverages compositions but with a sweetness impression which is lower than would usually be expected from the sweetener composition comprised in the beverage. It is another objective of the present invention to maintain the flavour impression of a beverage composition while reducing the sweetness impression without raising the acidity level and without introducing an objectionable bitter note, or astringency to the beverage composition.

It is a further objective of the present invention to define the amount of sweetness cutting compounds to be added to a beverage composition in dependence on the beverage composition as such, i.e. without the sweetness cutting compounds, so as to prevent the generation of a flavour impression substantially different from the original beverage composition.

SUMMARY OF THE INVENTION

The present invention relates to beverage compositions having a reduced sweetness impression and comprising optionally a $CO_2$ content of up to 10 times the volume of the liquid, a sweetening composition which may comprise natural or artificial sweetening compounds or combinations thereof including in particular high intensity sweeteners such as saccharin, acesulfam K, cyclamate, aspartame or fruit juice or fruit juice concentrate from fruit like those belonging to the Cucurbitaceae family, preferably Luo Han Guo fruit. The sweetening composition is included to provide a sweetening strength measured by the sweetness impression on an attribute grading test of a rating of at least 4 points in the attribute grading test (the test details and definitions are given below) when the sweetening composition is dissolved in water which has the same $CO_2$ content as desired for the final beverage. In the same test the bitterness impression is measured.

The beverage further comprises flavanols as a sweetness cutting composition in an amount of 60–150 ppm, preferably 70–120 ppm, more preferably 80–100 ppm by weight. In a preferred embodiment of the present invention the beverage composition further comprises one compound or a combination of compounds selected from triple sec flavour; vermouth flavour; mint flavour or combinations thereof.

The sweetening composition preferably contains compounds selected from the group of sugars such as saccharose, glucose, fructose, lactose, maltose, sorbit, dextrose, sorbose, xylit, lactit, maltit, isomaltit, or high intensity sweeteners such as saccharin, cyclamat, aspartam, acesulfam K, thaumatin, glycin or combinations thereof. The sweetness cutting composition according to the present invention can further contain compounds selected from the group of polyphenols of a molecular weight ranging from 500 to 3000, preferably ranging from 850 to 2800, such as tannins or tannic acids (e.g. obtainable from wood extractions, particularly from oak chips), gymnemic acid and its salts such as triterpene saponin, glycorides such as ziziphin or hodulcin, compounds such as 2 (4-methoxyphenoxy)-propanic-acids and -salts or -esters or combinations thereof.

Since the addition of $CO_2$ effectively reduces all flavour impressions of a composition it is not necessary or desirable to include $CO_2$ in the beverage compositions of the present invention for its sweetness impression reducing effect. However, $CO_2$ is considered by many consumers to provide or raise the refreshing and stimulating effect of a beverage. Hence the inclusion of $CO_2$ is desirable in the context of the present invention. The amount of $CO_2$ to be added in beverages preferably is in the range from 2 to 4 times the volume of the beverage, even more preferably in the range from 2.5 to 3.5 by volume.

DETAILED DESCRIPTION OF THE INVENTION

Definitions

As used herein the term "beverage" refers to a beverage composition which is in a single-strength, ready-to serve, drinkable form. Beverages of the present invention typically comprise at least 80% water. Beverages include both carbonated and noncarbonated forms.

As used herein, the term "beverage concentrate" refers to a beverage composition in liquid form usable to prepare a single strength beverage.

Beverage concentrates within the scope of the present invention typically comprise from 30% to 70%, preferably from 40% to 60%, water. They are usually formulated to provide, drinkable beverages when diluted with 2 to 5 parts by weight water.

As used herein mineral amounts are referred to as the supplemented amounts. Naturally contained minerals are not included when referring to mineral amounts.

As used herein the term single strength refers to the ready-to-serve concentration of beverage compounds.

As used herein the term "fruit juice" refers to citrus juices, such as orange juice, lemon juice, lime juice, grapefruit juice, tangerine juice and mixtures thereof. Non citrus juices such as apple juice, grape juice, pear juice, cherry juice, berry juice, pineapple juice, kiwi juice, cashew juice, peach juice, apricot juice, plum juice, prune juice, passion fruit juice, banana juice, melon juice, cranberry juice, acerola juice, litschi juice, karambola juice, mango juice, sharon fruit juice, cherry moya juice, lulo juice, physalis juice, and mixtures of these juices, as well as mixtures of citrus and non-citrus juices. All amounts of fruit juice referred to herein are on the basis of 100% fruit juice in its single strength concentration.

As used herein, the term "comprising" means various components can be conjointly employed in a beverage and beverage concentrate of the present invention. Accordingly the term "comprising" encompasses the more restrictive term "consisting of".

As used herein percentages are given as percent by weight of the beverage in its single strength dilution unless indicated otherwise. Percentages of water include the amount of water inherent in fruit juices.

Essential Compounds in the Beverage

According to the present invention beverage formulations are claimed comprising a sweetening composition and flavanols as a sweetness cutting composition to reduce the sweetness impression of the sweetening composition. Hence the required compounds in the beverage composition according to the present invention are the sweetening composition and the flavanols. However, it is desirable, and for any commercial successful beverage mandatory, to also comprise some or all of the optional compounds indicated below. They are therefore optional in respect to the technical development according to the present invention but commercially of high significance.

The sweetening composition according to the present invention consists of all compounds which provide sweetness in a beverage composition. Hence natural or artificial compounds which are considered to provide sweetness to a beverage composition are included in the sweetening composition according to the present invention. Also sweetening compounds which are included with other compounds, intentionally selected for other purposes such as for example flavour compositions or fruit juice compositions, are part of the sweetening composition according to the present invention.

Sweetening compositions typically comprise sugars such as saccharose, glucose, fructose, lactose, maltose, sorbit, dextrose, sorbose, xylit, lactit, maltit, isomaltit, or high intensity sweeteners such as saccharin, cyclamat, aspartam, acesulfam K, thaumatin, glycin. Also natural compounds known for their intense sweetness, so called natural high intensity sweeteners such as fruit juice or fruit juice concentrate from miracle fruit (synsepalum dulcificum of the family sapotaceae), from fruit of the Cucurbitaceae family, preferably Luo Han Guo fruit (*Siraitia grosvenorii* of the family Curcurbitaceae), serendipity berry (dioscoreophyllum cuminsii) or others are considered compounds which if present in a beverage composition form part of the sweetening composition of the beverage.

By "fruit juice or fruit juice concentrate of the fruit of the Cucurbitaceae family" it is understood puree or serum or juice from any fruit from the plant of the family Cucurbitaceae , tribe Jollifieae, subtribe Thladianthinae, genus Siraitia. Especially preferred are the genus/species *S. grosvenorii, S. siamensis, S. silomaradiae, S. sikkimensis, S. africana, S. borneensis*, and *S. taiwaniana*. The most preferred fruit is the genus /species *S. grosvenorii*, which is often called Luo Han Guo fruit. Although particular reference is made to Luo Han Guo juice or concentrated juice, other juices of the Cucurbitaceae family which contain at least 0.01% sweet triterpene glycosides or mogrosides are useful in this invention. Preferably the juices will contain more than 0.01% to about 20% mogrosides, preferably mogroside V, mogroside IV, siamenoside and mixtures thereof.

Chemically mogrosides are triterpene glycosides which are more fully described in U.S. Pat. No. 4,084,010. In particular mogroside IV, mogroside V and siamenoside I have a low calorie content and a sweetness which is said to be from about 300 to 500 times that of sugar. They are therefore especially useful as a sugar replacement or sweetening compound for beverages. The characteristics and chemical structural formula of mogroside IV, mogroside V siamenoside I have been described by Matsumoto et al.

Chemical-Pharmaceutical-Bulletin 38 (7), page 2030–2032, 1990 and R. Kasai et al. Agri. Biol. Chem. 53, (12) page 3347–3349, 1989.

Reference is made to WO 94/18854 for a typical process of preparing juice from fruit of the Cucurbitaceae family.

The amount of the sweetening composition, regardless how it is constituted in terms of its individual ingredients is such that in an attribute grading test the sweetening composition dissolved in water, which also comprises the same $CO_2$ content as desired for the beverage composition, provides the sweetening-in-water-solution with a sweetness impression of at least 4 rating points according to the attribute grading test as defined below. The reason for this minimum sweetness impression by the sweetening composition is that sweetening compositions having a sweetness impression below 4 rating points tend to be not considered sweet in the first place and reduction of their sweetness impression is not relevant to the acceptability of such beverages.

In a preferred embodiment according to the present invention the sweetness impression provided by the sweetening composition comprised in the present invention is at least such that it results in a rating of 6 rating points in an attribute grading test as defined below when analysing the sweetening composition in a water solution comprising the same $CO_2$ content as desired for the final beverage composition.

The other compound comprised in the beverages according to the present invention are flavanols. The flavanols can comprise natural or artificial flavanols which provide a reduction in the sweetness impression of beverage compositions. Preferably the flavanols are derived from or provided as green tea compounds. It preferably further comprises those compounds of sweetness cutting compositions as indicated above.

The amount of the flavanols is selected so as to provide a solution in water of the sweetening composition at a $CO_2$ content identical to that of the beverage composition with a sweetness impression which is at least 0.5 rating points, preferably from 0.8 to 2 rating points, lower than the sweetness impression of the same solution without the sweetness cutting composition in the attribute grading test defined below.

It is also important that the flavanols and other sweetness cutting compounds do not cause the overall composition to develop undesirable flavours. in particular bitter flavours and astringency have been found to be quite unacceptable in the context of green teas for beverages. Therefore, when using green tea to provide the flavanols an upper limit of the sweetness cutting effect is desirable while as an alternative the generation of a bitter taste impression can also be used as a check mark to adjust the amount of sweetness cutting composition included in the beverage composition. In particular if green tea is added in an amount which causes the composition of water, sweetening composition and sweetness cutting composition to develop an increase in the overall bitter taste of more than 2 points on the attribute grading scale such a quantity of sweetness cutting composition would not be desirable anymore.

Optional Compounds in the Beverage

Beverages contemplated in the context of the present invention can comprise a flavour composition which comprises a flavour selected from fruit flavours, botanical flavours, artificial flavours and mixtures thereof.

As used herein, the term "fruit flavour" refers to those flavour derived from the reproductive part of a seed plant, especially one having a sweet pulp associated with the seed. Also included but less preferred within the term "fruit flavour" are synthetically prepared flavours made to simulate fruit flavours derived from natural sources. Particularly preferred fruit flavours are the citrus flavours including orange flavours, lemon flavours, a variety of other fruit flavours can be used such as apple flavours, grape flavours, cherry flavours, pineapple flavours and the like. These fruit flavours can be derived from natural sources such as fruit juices as defined above and flavour oils, or else synthetically prepared.

As used herein, the term "artificial flavour" refers to flavours which cannot be derived from natural sources. Artificial flavours are in particular those flavours chemically generated or biologically engineered which provide a flavour impression outside the range of those naturally available. Artificial flavours are not those flavours which are synthetically prepared but chemically identical to natural flavours (i.e. fruit flavours or botanical flavours) which are considered as natural flavours synthetically prepared.

As used herein, the term "botanical flavour" refers to flavours derived from parts of a plant other than the fruit. As such, botanical flavours can include those flavours from nuts, bark, roots and leaves, including tea leaves. Also included within the term "botanical flavour" are synthetically prepared flavours made to simulate botanical flavours derived from natural sources. Examples of such flavours include cola flavours, tea flavours and the like. These botanical flavours can be derived from natural sources such as essential oils and extracts, or else can be synthetically prepared.

The flavour component can comprise a blend of various flavours e.g. lemon and lime flavours, cola flavours with citrus flavours to form cola flavours etc. If desired, fruit juices or their concentrates such as orange juice, lemon juice, lime juice, apple juice, grape juice and the like can be used in the flavour composition.

The flavour in the flavour composition is sometimes formed into emulsion droplets which are then dispersed in the final beverage. Because these droplets usually have a specific gravity less than that of water and would therefore form a separate phase in the final beverage, weighting agents (which can also act as clouding agents) are typically used to keep the emulsion droplets dispersed in the beverage. Examples of such weighting agents are brominated vegetable oils and resin esters, in particular the ester gums. See L. F. Green, *Developments in Soft Drinks Technology*, Vol. 1 (Applied Science Publishers Ltd. 1978) pp. 87–93 for a further description of the use of weighting and clouding agents in liquid beverages. Besides weighting agents, emulsifiers and emulsion stabilisers can be used to stabilise the emulsion droplets. Examples of such emulsifiers and emulsion stabilisers include the gums, pectins, celluloses, polysorbates, sorbitan esters and propylene glycol alginates. See L. F. Green, supra at p. 92.

The particular amount of the flavour composition effective for imparting flavour characteristics to a beverage can depend upon the flavour(s) selected, the flavour impression desired, and the form of the flavour composition. For flavour compositions which are substantially free of fruit juice (i.e. on a single strength basis comprising no more than about 1% fruit juice by weight of the beverage) the flavour composition can be comprised in the beverage at an amount of at least 0.001% by weight of the beverage and typically from 0.05% to 1% by weight of the beverage. If fruit juice or concentrates thereof are part of the flavour composition up to twice these amounts can be used.

Beverages contemplated according to the present invention may also be carbonated. Usually a beverage will be considered to be carbonated if it comprises more than 0.3, preferably more than 1 times the volume of the beverage of solubilized carbon dioxide. Carbonated beverages comprise carbondioxide typically from 1 to 4.5, preferably from 2 to 3.5 times the volume of the beverage.

The carbonated beverage can be placed in a container such as a bottle or a can which is then sealed. See L. F. Green, *Developments in Soft Drinks Technology*, Vol. 1 (Applied Science Publishers Ltd. 1978), pp. 102–107, for a further description of beverage making in particular the process for carbonation.

Another compound in a beverage composition considered in the context of the present invention are fruit juice compounds or its concentrate/puree. The juice compound according to the present invention is selected from one of the fruit juice compounds indicated above.

The amount of addition of juice concentrate to beverages preferably is in the range from as low as 0.5%, up to 60%, preferably from 1% to 30%, by weight on a single strength basis. In these amounts the fruit juice content in the beverage composition will provide a certain sweetener effect due to its sugar content. This sugar content is part of the sweetener composition of the beverage.

Optionally the beverages can comprise edible acids which include phosphoric acid, fumaric acid, adipic acid, lactic acid, tartaric acid, gluconic acid, succinic acid, malic acid, citric acid or their respective sour salts. Also optionally the beverages can comprise supplemented solubilized minerals which include iron, calcium, magnesium, potassium, sodium, as well as supplemented vitamins. Supplemented minerals or vitamins should be included in a quantity of 15%, preferably 30%, of the Recommended Daily Intake in 100 ml beverage product according to the European Council Directive No. 90/496/EEC of September 24, 1990 on nutritional labeling for foodstuff.

Attribute Grading Test

Attribute grading tests have conventionally been used in the foods and beverage industry to assess the perception of certain aspects of a food or beverage by an educated rating panel. The attributes which are rated for the purpose of the present invention are sweetness, bitterness and possibly astringency.

Due to the wide use of attribute grading tests in the food and beverage industry a standard test set-up has been established under ISO 6564–1985 (E), "*Sensory Analysis—Methodology—Flavour profile methods*". This ISO test allows a wide variety of test set-ups depending on the particular purpose of the test.

According to the present invention this test norm was used with the following specific settings. Together with these settings the test is referred to in the claims as the modified Attribute Grading test or mAG-test.

The particular test settings are:
only trained experts are included as assessors in the sensory test;
only the independent test method is used;
the selected character notes for each test are sweet, bitter, thick liquid, caramelized, refreshing, astringent (in this order of perception);
the intensity for selected character notes is rated on a line scale of 17 cm and is directly transferred into numerical values between 0 and 9.9. A value of 0 in this respect refers to a character note not being present while 9.9 is equivalent to an assessment of an extremely noticeable note.

The resulting data are reported in tabular form with numerical values.

The preparation of the taste samples is such that they are chilled to 12° C. and 100 ml per sample are presented for evaluation.

In the test the assessor first evaluate a reference composition for the above character notes and then evaluate the test sample versus the reference. All other conditions of the test are identical to those given in ISO 6564–1985 (E).

TEST RESULTS

Test Compositions

| | |
|---|---|
| A: | water sucrose solution with 8% sucrose |
| B: | same as A with a green tea sweetness cutting compound providing a calculated flavanol level of 124 ppm. |
| C: | a sweetening composition solubilized in water comprising 4% sugar plus high intensity sweeteners to achieve approximately the same sweetness as a 8% sucrose in water solution. |
| D: | same as C with a green tea sweetness cutting compound providing a calculated flavanol level of 124 ppm. |
| E: | same as C with $CO_2$ in a quantity of 2 times the volume of the composition. |
| F: | same as D with $CO_2$ in a quantity of 2 times the volume of the composition. |
| G: | same as A with 3.52 mg/l of quinine HCl (standard amount in bitter lemon or tonic beverages). |

Test Ratings (Average Numerical Value)

| | A | B | C | D | E | F |
|---|---|---|---|---|---|---|
| sweet | 7.2 | 6.2 | 6.5 | 5.6 | 5.8 | 5.0 |
| bitter | 0.3 | 1.4 | 1.3 | 2.1 | 2.4 | 2.7 |
| astringent | 0 | 2.0 | 0.5 | 2.2 | 1.6 | 2.8 |

| | A | G |
|---|---|---|
| sweet | 7.0 | 6.3 |
| bitter | 0.5 | 4.4 |
| astringent | 0.5 | 2.3 |

According to the test ratings shown above the addition of flavanols from green tea does result in the desired sweetness cutting effect when comparing compositions A and B while raising bitter and astringent impression within an acceptable level. This is also found when replacing the succrose sweetening solution by a sugar plus high intensity sweetening composition. The result is further confirmed in the context of a carbonized system when comparing compositions E and F. In contrast usual sweetness cutting composition such as those used in bitter lemon or tonic beverages result in an unacceptable bitter note while not even providing the same sweetness cutting performance as composition B.

We claim:

1. Beverage composition of reduced sweetness impression, said beverage composition comprising:
    a $CO_2$ content of from 0 to 10 times the volume of said beverage composition;
    a sweetening composition comprising one or more natural or artificial sweetening compounds or combinations thereof, said sweetening composition providing a sweetness impression value in a water solution at the same $CO_2$ content as comprised in said beverage, wherein said sweetness impression is at least 4 rating points according to a modified attribute grading test (mAG-test);

a sweetness cutting composition comprising one or more natural or artificial compounds;

wherein said sweetness cutting composition comprises from 60 to 150 ppm by weight flavanols, and wherein the flavanols are selected from the group consisting of green tea, green tea derivatives, gymnemic acid and salts thereof, glycorides, (4-methoxyphenoxy)-propanic acids and salts thereof, and mixtures thereof.

2. Beverage composition according to claim 1 wherein said sweetness cutting composition comprises one or more botanical flavour compounds.

3. Beverage composition according to claim 2 wherein said sweetness cutting composition comprises from 70 to 120 ppm by weight flavanols.

4. Beverage composition according to claim 3 wherein said sweetness cutting composition comprises from 80 to 100 ppm by weight flavanols.

5. Beverage composition according to claim 1 further comprising at least one compound selected from the group consisting of triple sec flavour, vermouth flavour, mint flavour, and combinations thereof.

6. Beverage composition according to claim 1 wherein said sweetening composition comprises one or more compounds selected from the group consisting of saccharose, glucose, fructose, lactose, maltose, sorbit, dextrose, sorbose, xylit, lactit, maltit, isomaltit, saccharin, cyclamat, aspartame, acesulfam K, thaumatin, glycin, fruit juice or juice concentrate from miracle fruit, fruit juice or juice concentrate from Cucurbitaceae fruit, fruit juice or juice concentrate from serendipity berry, and combinations thereof.

7. Beverage composition according to claim 6 wherein said $CO_2$ content is from 2 to 4 times the volume of the beverage composition.

8. A beverage composition according to claim 1 wherein the sweetness cutting composition is provided in an amount that will reduce the sweetness impression of said sweetening composition in a water solution at the same $CO_2$ content as comprised in said beverage by at least 0.5 rating points according to said mAG-test without raising said bitterness impression by more than 2 rating points according to said mAG-test.

* * * * *